United States Patent
Lee et al.

(10) Patent No.: US 7,525,947 B2
(45) Date of Patent: *Apr. 28, 2009

(54) METHOD AND APPARATUS FOR TUNNELING SERVICE OF EXPLICIT MULTICAST IN MOBILE IP NETWORK

(75) Inventors: Ji-Woong Lee, Seoul (KR); Myung-Ki Shin, Daejeon (KR)

(73) Assignee: KTFREETEL Co., Ltd, Seoul (KR)

( * ) Notice: Subject to any disclaimer, the term of this patent is extended or adjusted under 35 U.S.C. 154(b) by 873 days.

This patent is subject to a terminal disclaimer.

(21) Appl. No.: 10/868,641

(22) Filed: Jun. 14, 2004

(65) Prior Publication Data

US 2004/0223465 A1 Nov. 11, 2004

Related U.S. Application Data

(63) Continuation of application No. PCT/KR02/02270, filed on Dec. 3, 2002.

(30) Foreign Application Priority Data

Dec. 12, 2001 (KR) .................... 10-2001-0078505

(51) Int. Cl.
*H04J 3/24* (2006.01)
*H04L 12/28* (2006.01)
*H04J 3/26* (2006.01)

(52) U.S. Cl. .................... 370/349; 370/390; 370/392; 370/432

(58) Field of Classification Search ............... 370/313, 370/328, 329, 338, 351, 389, 390, 392, 400, 370/401, 432
See application file for complete search history.

(56) References Cited

U.S. PATENT DOCUMENTS 6,055,236 A 4/2000 Nessett et al.

(Continued)

FOREIGN PATENT DOCUMENTS

JP 10-107852 4/1998

(Continued)

OTHER PUBLICATIONS

Vaska Visoottiviseth, Youki Kadonayashi and Suguru Yamaguchi, "An Asymmetrical Group Management System for Sender Initiated Multicast", Sep. 15, 2001, abstract only.

(Continued)

*Primary Examiner*—Seema S Rao
*Assistant Examiner*—Christine Duong
(74) *Attorney, Agent, or Firm*—Knobbe Martens Olson & Bear LLP

(57) ABSTRACT

Inventive embodiments relate to a method and an apparatus for tunneling service of an explicit multicast in a mobile IP network to forward multicast packets to plural mobile nodes with effect. When the apparatus providing the tunneling service for an explicit multicast in a mobile IP network receives a multicast packet from a correspondent node with a network, it extracts mobile nodes existing in a path for tunneling from among the plurality of mobile nodes. Also, after it creates an explicit multicast tunnel header having a destination address as a Co-Located Care-of Address (CL COA) of the mobile nodes existing in the path for tunneling, it tunnels a multicast packet that was encapsulated using the explicit multicast tunnel header to the mobile nodes.

15 Claims, 12 Drawing Sheets

U.S. PATENT DOCUMENTS

| | | | |
|---|---|---|---|
| 6,189,039 | B1 | 2/2001 | Harvey et al. |
| 6,611,872 | B1 | 8/2003 | McCanne |
| 6,628,654 | B1 | 9/2003 | Albert et al. |
| 6,708,219 | B1 | 3/2004 | Borella et al. |
| 6,721,297 | B2 * | 4/2004 | Korus et al. ............... 370/338 |
| 6,765,892 | B1 * | 7/2004 | Leung et al. ............... 370/332 |
| 6,804,221 | B1 * | 10/2004 | Magret et al. ............... 370/338 |
| 6,816,912 | B1 * | 11/2004 | Borella et al. ............... 709/238 |
| 7,339,903 | B2 | 3/2008 | O'Neill |
| 2002/0012327 | A1 * | 1/2002 | Okada ............... 370/328 |
| 2002/0075866 | A1 * | 6/2002 | Troxel et al. ............... 370/389 |
| 2004/0223465 | A1 | 11/2004 | Lee et al. |
| 2006/0171322 | A1 | 8/2006 | Lee |

FOREIGN PATENT DOCUMENTS

| | | |
|---|---|---|
| JP | 2000-236328 | 8/2000 |
| JP | 2001-230774 | 8/2001 |
| JP | 2001-244976 | 9/2001 |
| JP | 2002-217952 | 8/2002 |
| JP | 2005-507609 | 3/2005 |
| KR | 10-2001-0025940 | 4/2001 |
| KR | 10-2002-0023100 | 3/2002 |

OTHER PUBLICATIONS

Imai Yuji, Method for Making New Protocol of IPv6 (specialized in Xcast), Jun. 14, 2001, abstract only.

Toshiaki Saeki et al., "Destination Management on Explicit Multicast", Aug. 2000, abstract only.

Boivie, R. et al., "Explicit Multicast (Xcast) Basic Specification <draft-ooms-xcast-basic-spec-02.txt>" Internet Draft, Oct. 2001.

Boivie, R. et al., "Explicit Multicast (Xcast) Basic Specification <draft-ooms-xcast-basic-spec-03.txt>" Internet Draft, Jun. 2002.

Lee, Jiwoong, "Explicit Multicast Tunneling <draft-lee-xcast-tunneling-oo.txt>" Internet Draft, Dec. 2001.

Lee, Jiwoong, Explicit Multicast Tunneling <draft-lee-xcast-tunneling-01.txt> Internet Draft, Aug. 2002.

European Search Report by European Patent Office on Apr. 13, 2007.

* cited by examiner

METHOD AND APPARATUS FOR TUNNELING SERVICE OF EXPLICIT MULTICAST IN MOBILE IP NETWORK

RELATED APPLICATIONS

This application is a continuation application, and claims the benefit under 35 U.S.C. §§ 120 and 365 of PCT Application No. PCT/KR02/02270, filed on Dec. 3, 2002 and published Jun. 19, 2003, in English, which is hereby incorporated by reference. This application claims the benefit under 35 U.S.C. § 119 to an application filed in the Korean Intellectual Property Office on Dec. 12, 2001 and assigned Serial No. 10-2001-0078505, which is hereby incorporated by reference. This application is related to, and hereby incorporates by reference, U.S. Patent Application entitlted "SYSTEM AND APPARATUS FOR TUNNELING SERVICE OF EXPLICIT MULTICAST," filed on May 25, 2004 and having application Ser. No. 10/854,616.

BACKGROUND OF THE INVENTION

1. Field of the Invention

The invention relates to a method and an apparatus for tunneling service of explicit multicast in a mobile IP network, and more specifically to a method and an apparatus for tunneling service of explicit multicast in a mobile IP network for transmitting a multicast packet to plural mobile nodes efficiently.

2. Description of the Related Art

Generally, mobile IP, such as used in cellular telephone networks, is used for receiving a data packet having an address within a home network continuously while the Internet node which connects with a network (home network) on regular basis connects with another network (foreign network) temporarily. In turn, the Internet node connecting with the foreign network is called a mobile node.

Plural mobile nodes are provided with Internet multicast service on the mobile IP network in two ways. According to the first method, the mobile node is provided with the multicast service by joining with a multicast group through the multicast router on a foreign network in which the mobile node visits. According to the second method the mobile node is provided with the multicast service by joining with a multicast group through a home agent.

Upon comparison, the first method has an advantage that the mobile node can receive the multicast packet via relatively optimized path when the mobile node receives the multicast packet from the outside of the network, but this requires that the foreign network that the mobile node visits uses a router to provide the multicast service. However, the first method is not available if the mobile node is set up unless the multicast service should be provided for security reasons when the mobile node connects with a foreign network.

As described above, the multicast service is typically provided in the mobile IP network by a home agent to prevent the problems of multicast service occurring through the path on the foreign network.

SUMMARY OF CERTAIN INVENTIVE ASPECTS OF THE INVENTION

One aspect of the invention provides a method and an apparatus for explicit multicast tunneling service on a mobile IP network to execute multicast tunneling by an explicit multicast packet having explicit multicast tunnel header including the care-of address list of plural mobile IPs.

Another aspect of the invention provides a method and an apparatus for explicit multicast tunneling service on a mobile IP network to execute multicast tunneling by an explicit multicast packet having the explicit first and the second multicast tunnel headers including the list of home network addresses and care-of addresses of plural mobile IPs.

Another aspect of the invention provides a method for multicast tunneling service to transmit a multicast packet transmitted from a correspondent node to plural mobile nodes on a mobile IP network. The method comprises the step of mobile nodes using CL COA comprising the steps of receiving the multicast packet from the correspondent node, recognizing the mobile node located on the tunneling path of the received multicast packet of the plural mobile nodes, generating the explicit multicast tunnel header of which the destination address is the CL COA of the mobile node located on the tunneling path, encapsulating the received multicast packet by the generated explicit multicast tunnel header, and tunneling the encapsulated multicast packet to the mobile node.

Another aspect of the invention provides a method for multicast tunneling service to transmit a multicast packet transmitted from a correspondent node to plural mobile nodes on a mobile IP network. The method comprises the step of receiving the multicast packet from the correspondent node, recognizing the mobile node located on the tunneling path of the received multicast packet of the plural mobile nodes, generating the first explicit multicast tunnel header of which the destination address is the home network address of the mobile node located on the tunneling path, encapsulating the received multicast packet by the first explicit multicast tunnel header, generating the second explicit multicast tunnel header of which the destination address is the foreign agent COA of the mobile node located on the tunneling path, encapsulating the received multicast packet by the second explicit multicast tunnel header, and transmitting the re-encapsulated multicast packet to the tunneling path.

DETAILED DESCRIPTION OF CERTAIN EMBODIMENTS OF THE INVENTION

Figure 1:
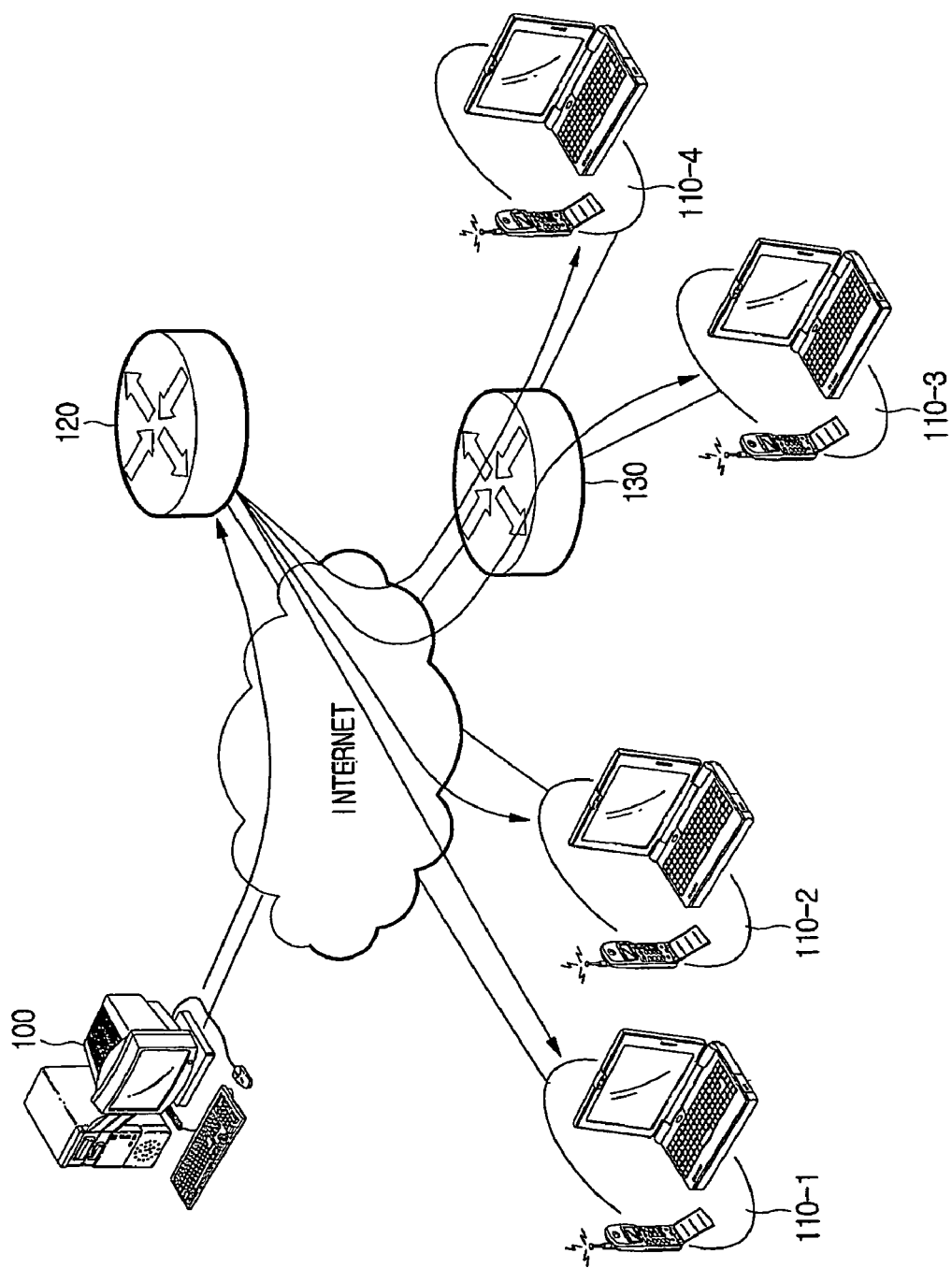
FIG. 1 represents a schematic configuration of a typical tunneling service apparatus.

FIG. 1 represents a schematic configuration of a typical tunneling service apparatus, and FIG. 2A to FIG. 2G represent the structure of a multicast packet used in the apparatus of FIG. 1.

Referring to FIG. 1, the first-the fourth mobile nodes 110-1, 110-2, 110-3, 110-4 that receive a multicast packet from a correspondent node 100 are connected with a foreign network after departing from a home network. Accordingly the first-the fourth mobile nodes 110-1, 110-2, 110-3, 110-4 are allocated a COA (care-of address). Furthermore, the first and the second mobile nodes 110-1, 110-2 are allocated a CL COA (Co-Located Care-of Address) by a DHCP server (Dynamic Host Configuration Protocol Server—not shown) on the foreign network. Also, a foreign agent care-of address (foreign agent COA) is allocated to the third and the fourth mobile nodes 110-3, 110-4 by using path information of a foreign agent 130 on the foreign network.

Figure 2A:
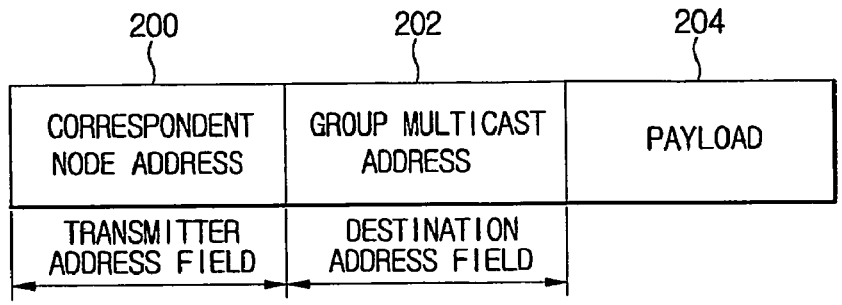
FIG. 2A-FIG. 2G represent the structure of a multicast packet used in the apparatus of FIG. 1.

The correspondent node 100 generates the first multicast data packet as shown in FIG. 2A and transmits it to the home agent 120 to provide predefined service or information for the first—the fourth mobile nodes 110-1, 110-2, 110-3, 110-4. As shown in FIG. 2A, the first multicast packet includes a transmitter address field 200 storing the address of the correspondent node 100, destination address field 202, and payload 204 for storing data. Furthermore, the destination address field 202 stores the predefined address of a group multicast for multicasting by the group to which the first—the fourth mobile nodes 110-1, 110-2, 110-3, 110-4 belong.

The address of the group multicast is designated from '224.0.0.0'-'239.255.255.255' and is given to the multicast group. The home agent 120 recognizes the transmission path of the first multicast packet by identifying a join signal inputted from the first-the fourth mobile nodes 110-1, 110-2, 110-3, 110-4 to receive the multicast packet from the correspondent node 100. Accordingly, the recognized transmission path of the first multicast packet is from the first mobile node 110-1, via the second mobile node 110-2 to the foreign agent 130.

The home agent 120 generates a tunnel header, of which a transmitter address is the home agent address and a destination address is the CL COA of the first mobile node 110-1, encapsulates the first multicast packet, and generates the second multicast packet to transmit it to the first mobile node 110-1.

Figure 2B:
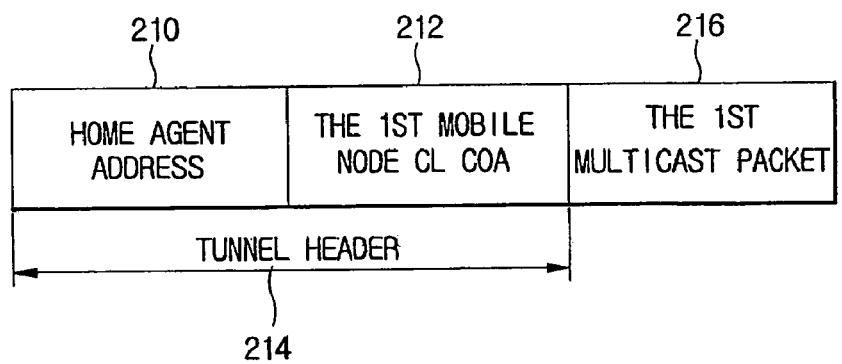

As shown in FIG. 2B, the second multicast packet includes the tunnel header 214 including a home agent address field 210, the first mobile node CL COA 212, and the first multicast packet field 216.

Also, the home agent 120 generates a tunnel header of which the transmitter address is the home agent address and the destination address is CL COA of the second mobile node 110-2, encapsulates the first multicast packet, and generates the third multicast packet to transmit it to the second mobile node 110-2.

Figure 2C:
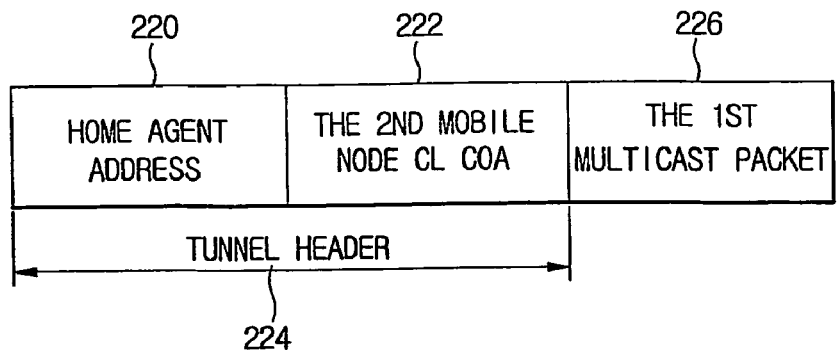

As shown in FIG. 2C, the third multicast packet includes the tunnel header 224 including a home agent address field 220, the second mobile node CL COA 222, and the first multicast packet field 226.

The home agent 120 transmits the generated second and the third multicast packets to the first and the second mobile nodes 110-1, 110-2 in accordance with the first and the second mobile nodes CL COA by unicast tunneling.

At this time, the first and the second mobile nodes 110-1, 110-2 remove the tunnel header from the second and the third multicast packets transmitted from home agent 120 and checks the first multicast packet transmitted from the correspondent node.

Also, the home agent 120 generates the first tunnel header of which the transmitter address is the home agent address and the destination address is the home network address of the second mobile node 110-2, and encapsulates the first multicast packet. Further, the home agent 120 generates the second tunnel header of which the transmitter address is the home agent address and the destination address is CL COA of the third mobile node, and encapsulates the encapsulated first multicast packet again by appending the second tunnel header to the first multicast packet to generate the fourth multicast packet.

Figure 2D:
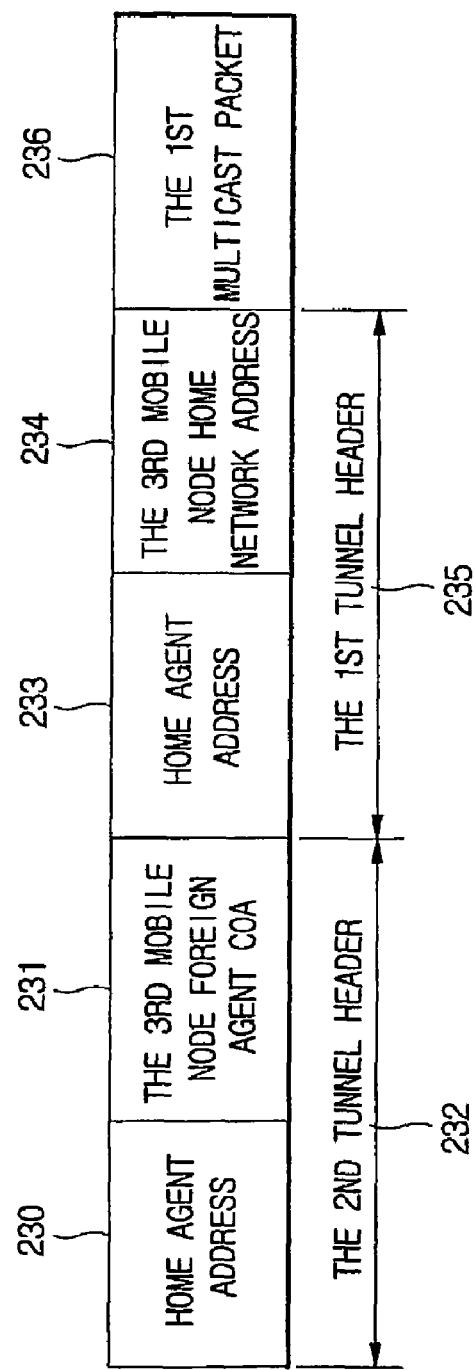

As shown in FIG. 2D, the fourth multicast packet includes the second tunnel header 232 including home agent address field 230 and the home network address field of third mobile node 231, the first tunnel header 235 including home agent address filed 233 and the CL COA field of the third mobile node, and the first multicast packet field 236.

Also, the home agent 120 generates the first tunnel header of which the transmitter address is the home agent address and the destination address is the home network address of the fourth mobile node and encapsulates the first multicast packet.

And, the home agent 120 generates the second tunnel header of which the transmitter address is the home agent address and the destination address is CL COA of the fourth mobile node and encapsulates the encapsulated first multicast packet again by appending the second tunnel header to the first multicast packet to generate the fifth multicast packet.

Figure 2E:
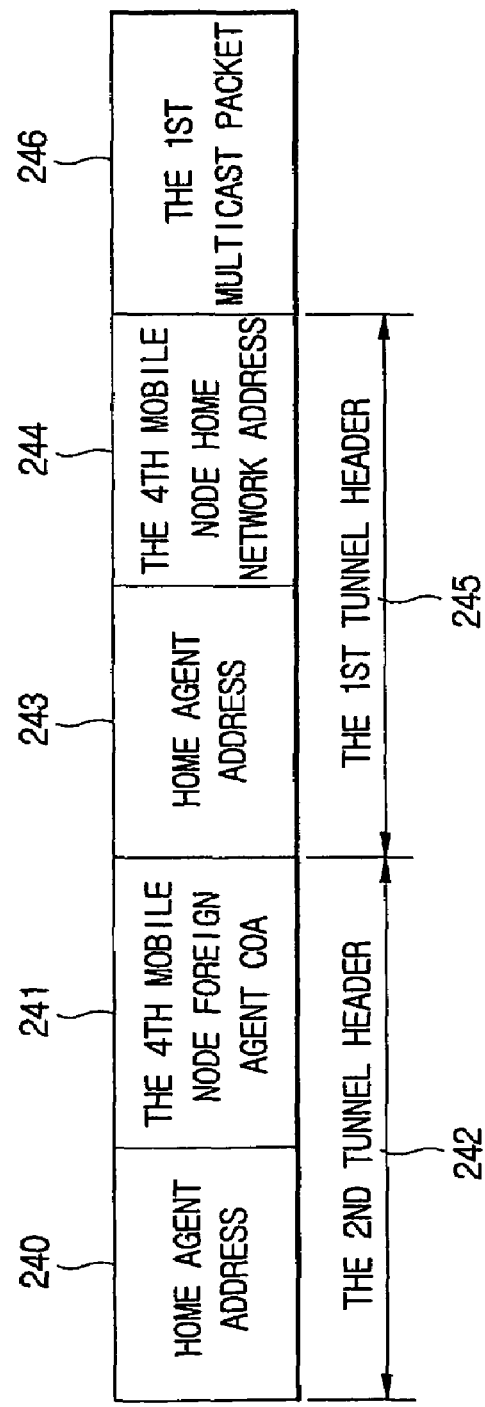

As shown in FIG. 2E, the fifth multicast packet includes the second tunnel header 242 including home agent address field 240 and the home network address field of fourth mobile node 241, the first tunnel header 245 including home agent address filed 243 and the CL COA field of the third mobile node 244, and the first multicast packet field 246.

The home agent 120 transmits the generated the fourth and the fifth multicast packets to foreign agent 130 in accordance with foreign agent COA using unicast tunneling. The foreign agent 130 transmits the sixth and the seventh multicast packets to the third and the fourth mobile nodes 110-3, 110-4 that removes the second tunnel header 232, 242 from the fourth and the fifth multicast packets received by tunneling.

Figure 2F:
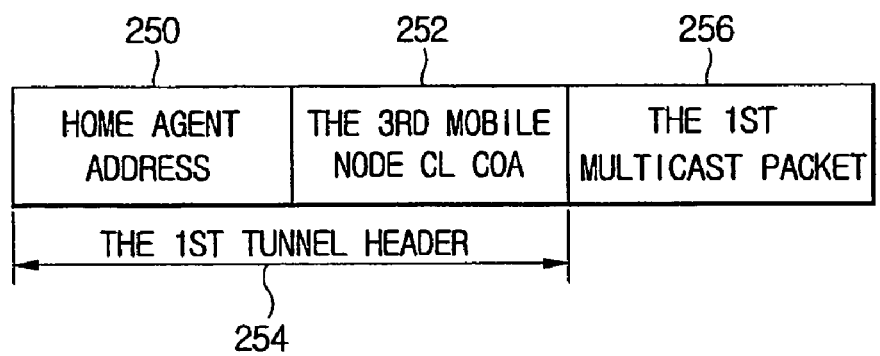

As shown in FIG. 2F, the sixth multicast packet includes the first tunnel header 254 including home agent address field 250 and the home network address field of third mobile node 252 and the first multicast packet field 256.

Figure 2G:
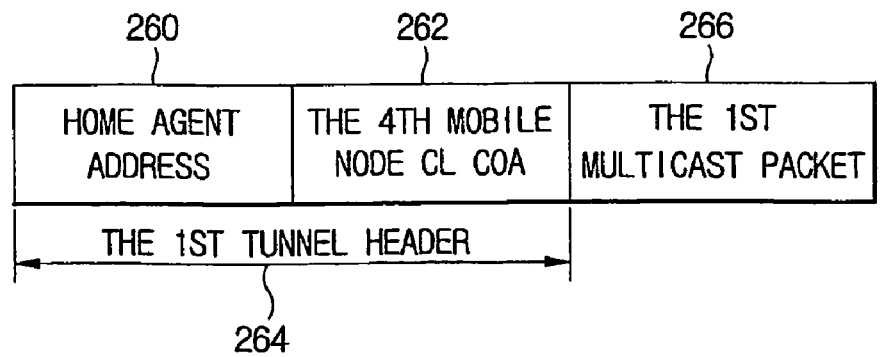

As shown in FIG. 2G, the seventh multicast packet includes the first tunnel header 264 including home agent address field 260 and the home network address field of fourth mobile node 262 and the first multicast packet field 266.

The third and the fourth mobile nodes 110-3, 110-4 remove the first tunnel headers 254, 264 from the sixth and the seventh multicast packets transmitted from the foreign agent 130 to identify the first multicast packet transmitted from the correspondent node 100. The foreign agent 130 doesn't have information about the COA of the third and the fourth mobile nodes 110-3, 110-4.

Therefore, the home agent 120 executes nested tunneling (to perform tunneling in accordance with each header by appending the first and the second tunnel headers to the first multicast packet to encapsulate the first multicast packet) to transmit the first multicast packet transmitted from the correspondent node 100 to the third and the fourth mobile nodes 110-3, 110-4.

As described above, the above multicast tunneling apparatus performs unicast tunneling by duplicating the multicast packets per the number of mobile nodes, encapsulating the multicast packet by COA of the mobile node, and transmitting the multicast packet to the mobile node. That is, the home agent 120 duplicates the n multicast packets to transmit the multicast packets to the n mobile nodes and performs the unicast tunneling so that the n duplicated packet is transmitted to each mobile node.

At this time, if the path is close to the home agent 120 the path is jammed about n times as the jam which happens when the multicast packet is transmitted. This is called a multicast landslide. The greater the mobile nodes are provided with multicast service within the same foreign network by the same home agent 120, the greater the extent that the multicast landslide occurs.

Therefore, the multicast loses its original effect that it can minimize transmission path requisition bandwidth during transmission of the same message since the same packets (the same payload) are transmitted through the same path, that is, the home agent 120 at the same time.

Also, trials occurred to define a decentralized structure, a data signal for the home agent, and the foreign agent to exchange information about mobile nodes. However, difficulties resulted while introducing it since there are many independent network operators who have different operation policies.

Hereinafter, preferred embodiments of a method and an apparatus for explicit multicast tunneling service on a mobile IP network according to the invention will be described in more detail with reference to the accompanying drawings.

Figure 3:
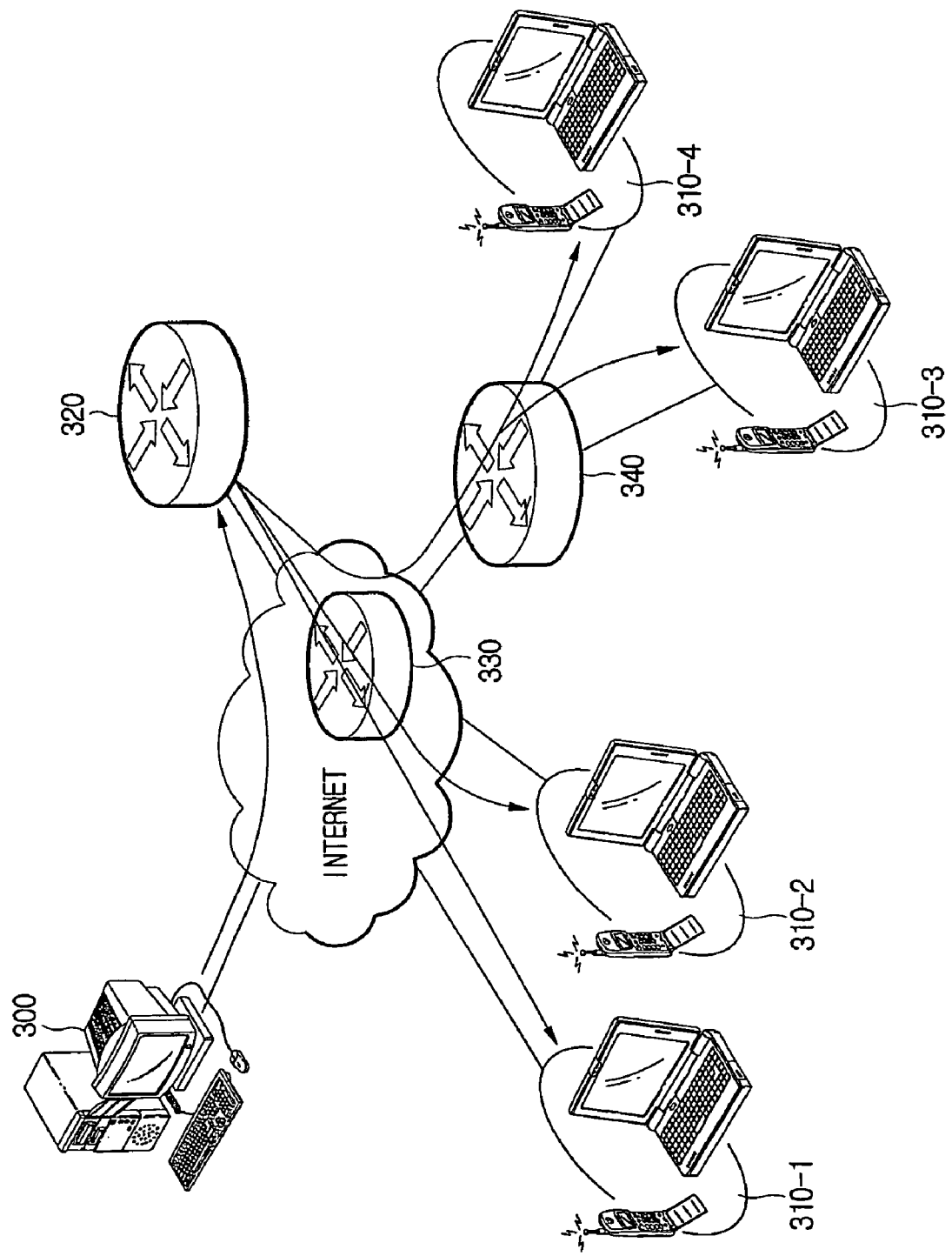
FIG. 3 represents the schematic configuration of an apparatus for explicit multicast tunneling service on a mobile IP network according to the invention.

FIG. 3 represents a schematic configuration of an apparatus for explicit multicast tunneling service on a mobile IP network according to the invention, and FIG. 4A to FIG. 4G represent the structure of a multicast packet used for explicit multicast tunneling service on a mobile IP network according to the invention. Referring to FIG. 3, an apparatus for explicit multicast tunneling service on a mobile IP network includes the first to the fourth mobile nodes 310-1, 310-2, 310-3 and 310-4 that receive a multicast packet from the correspondent node 300 connected with home network, and the home agent 320 transmits the multicast packet transmitted from the correspondent node 300 to the first to the fourth mobile nodes 310-1, 310-2, 310-3 and 310-4 through via-router 330 and foreign agent 320.

At this time, the first to the fourth mobile nodes 310-1, 310-2, 310-3 and 310-4 are the ones that visit the foreign network after departing from the home network, while the CL COA (Co-Located Care-of Address) is allocated to the first and the second mobile nodes 310-1, 310-2 from the DHCP server (Dynamic Host Configuration Protocol Server—not shown) on the foreign network. Also, the foreign agent care-of address is allocated at the third and the fourth mobile nodes 310-3 and 310-4 by using the path information of a foreign agent 340 on the foreign network. Furthermore, the COA and the foreign agent COA are the terminal addresses of a tunnel facing the first to the fourth mobile nodes 310-1, 310-2, 310-3 and 310-4 when the first to the fourth mobile nodes 310-1, 310-2, 310-3 and 310-4 are located within the foreign network.

The first to the fourth mobile nodes 310-1, 310-2, 310-3 and 310-4 notify the COA allocated to them when they connect with the foreign network of home agent 320 to join the multicast service. Also, the first to the fourth mobile nodes 310-1, 310-2, 310-3 and 310-4 transmit a join signal for multicast service to receive a multicast packet from the correspondent node 300 to the correspondent node 300 through the home agent 320.

The home agent 320 encapsulates the multicast packet transmitted from correspondent node 300 by appending a tunnel header including the COA list of the first to the fourth mobile nodes 310-1, 310-2, 310-3 and 310-4 to execute the multicast tunneling. The via-router 330 transmits the encapsulated multicast packet transmitted from the home agent 320 by the multicast tunneling of the home agent 320 to the first and the second mobile nodes 310-1, 310-2 while the foreign agent 340 transmits the encapsulated multicast packet transmitted from the home agent 320 to the third and the fourth mobile nodes 310-3 and 310-4.

Figure 4A:
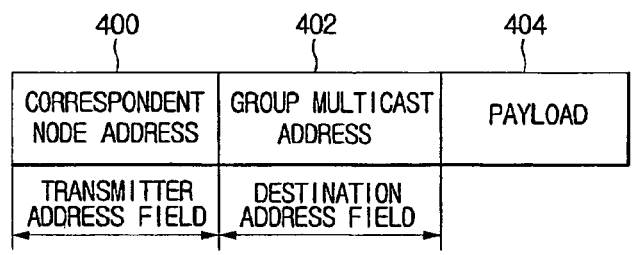
FIG. 4A-FIG. 4G represent the structure of multicast packet used for explicit multicast tunneling service on a mobile IP network according to the invention.

The operation of the explicit multicast tunneling service on a mobile IP network according to the invention will be described. The correspondent node 300 generates the first multicast packet for transmission to the first to the fourth mobile nodes 310-1, 310-2, 310-3 and 310-4 and transmits it to the home agent 320. As shown in FIG. 4A, the first multicast packet includes a transmitter address field 400 storing the address of the correspondent node 300, a destination address field 402 storing a group multicast address, and a payload 404 storing data. Accordingly, the address of the group multicast is designated from '224.0.0.0' to '239.255.255.255' and given to the multicast group.

The home agent 320 recognizes the transmission path, that is, the via-router 330 and the foreign agent 340 of the received multicast packet by a join signal inputted from the first to the fourth mobile nodes 110-1, 110-2, 110-3, 110-4. Thereafter, the home agent 320 generates a multicast packet for transmission to a recognized transmission path, that is, the via-router 330 and the foreign agent 340. In other words, the home agent 320 generates the explicit multicast tunnel header of which the transmitter address is the home agent address and the destination address is the CL COA of the first mobile node 310-1 and the second mobile node 310-2, encapsulates the first multicast packet by a generated explicit multicast tunnel header, and generates the second multicast packet.

Figure 4B:
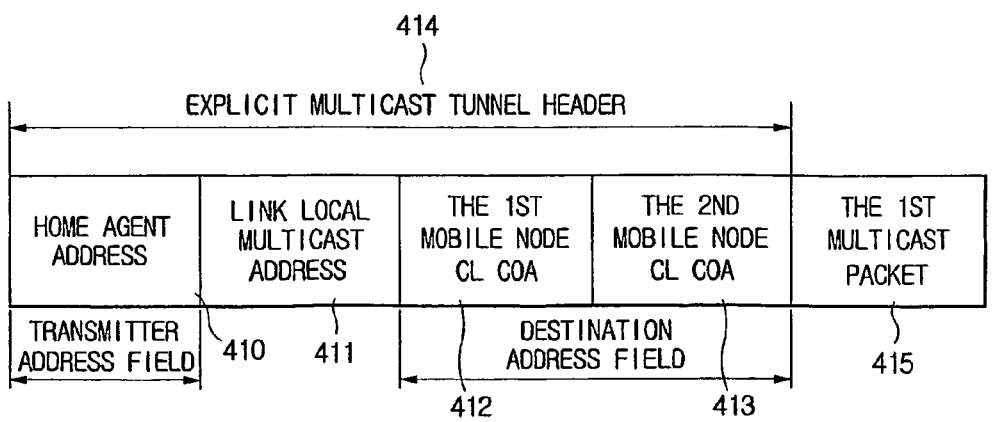

As shown in FIG. 4B, the second multicast packet includes a tunnel header 414 including a home agent address field 410, a link local multicast address field 411, the first mobile node CL COA field 412 and the second mobile node CL COA address field 413, and the first multicast packet field 415 storing the first multicast packet. Furthermore, the link local multicast address stored in the link local multicast address field 411 is designated from '244.0.0.0' to '239.255.255.255' (multicast group address to distinguish multicasts) and given to the multicast group.

The home agent 320 transmits the generated second multicast packet to the via-router 330 by multicast tunneling while the via-router 330 recognizes the next transmission path, that is, the first and the second mobile nodes 310-1, 310-2 by identifying the first and the second mobile nodes CL COA stored in the destination address field of the received second multicast packet. Then the via-router 330 generates the third and the fourth multicast packets for transmission to the transmission path recognized by the explicit multicast routing, that is, the first and the second mobile nodes 310-1, 310-2.

Figure 4C:
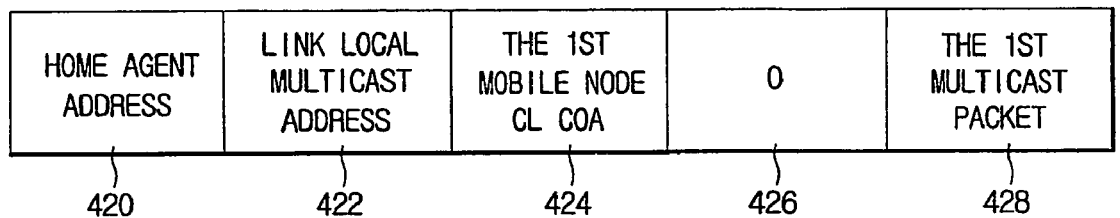

As shown in FIG. 4C, the third multicast packet to be transmitted to the first mobile node 310-1 by the explicit multicast routing includes the home agent address field 420 storing the home agent address, a link local multicast address field 422, the first mobile node CL COA field 424 storing the first mobile node CL COA of the first mobile node 310-1, the second mobile node CL COA address field 426 storing '0', and the first multicast packet field 428. The link local multicast address field 422 stores the link local multicast address, and the first multicast packet field 428 stores the first multicast packet.

Figure 4D:
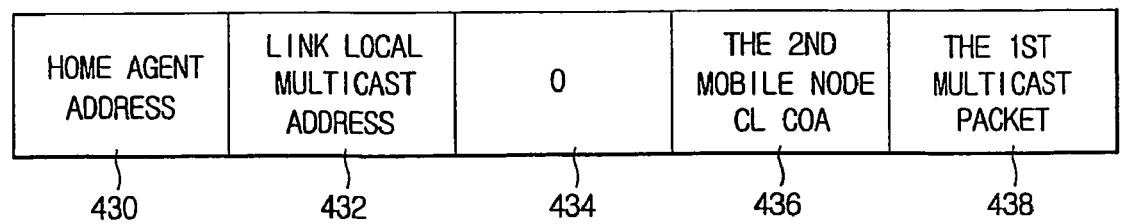

Also, as shown in FIG. 4D, the fourth multicast packet to be transmitted to the second mobile node 310-2 by the explicit multicast routing includes a home agent address field 430 storing the home agent address, a link local multicast address field 432, the first mobile node CL COA field 434 storing '0', the second mobile node CL COA field 436 storing the CL COA of the second mobile node 310-2, and the first multicast packet field 438. The link local multicast address field 432 stores the link local multicast address, and the first multicast packet field 438 stores the first multicast packet.

The via-router 330 generates the third and the fourth multicast packets to the first and the second mobile nodes 310-1, 310-2 by explicit multicast routing. The first and the second mobile nodes 310-1, 310-2 identify the first multicast packet transmitted from the correspondent node 300 by removing each explicit multicast tunnel header from the third and the fourth multicast packets transmitted from the via-router 330.

The home agent 320 generates the first explicit multicast tunnel header home agent of which transmitter address is the home agent address and the destination address is the home network address of the third mobile node 310-3 and the fourth mobile node 310-4, and encapsulates the first multicast packet by the generated explicit multicast tunnel header. Then the home agent 320 generates the explicit multicast tunnel header home agent of which the transmitter address is the home agent address and the destination address is the CL COA of the third mobile node 310-3 and the fourth mobile node 310-4, encapsulates the first multicast packet by generating the second explicit multicast tunnel header, and generates the fifth multicast packet.

Figure 4E:
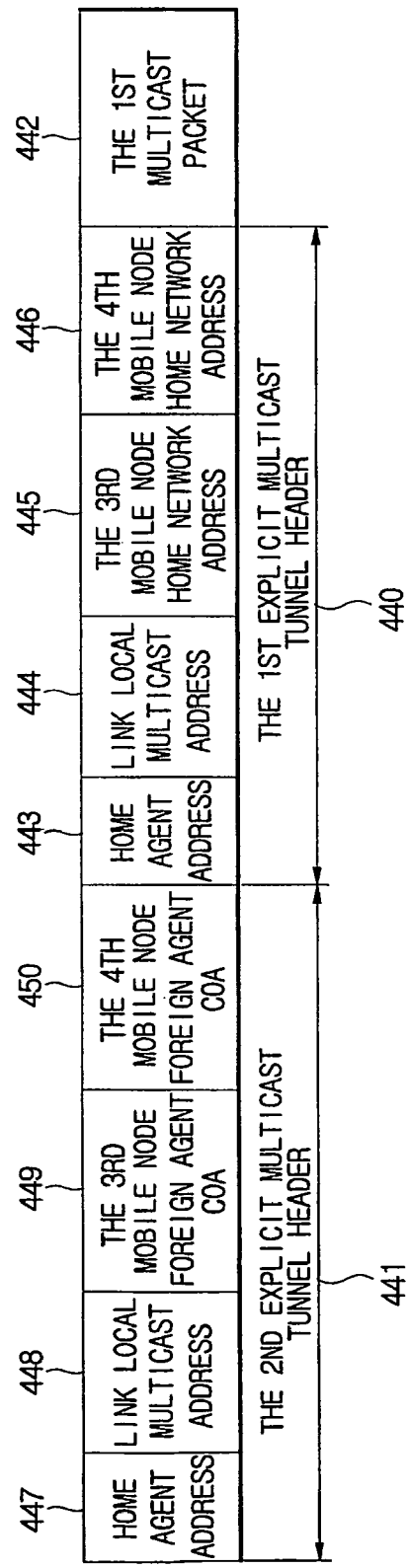

As shown in FIG. 4E, the fourth multicast packet includes the first explicit multicast tunnel header 440, the second explicit multicast tunnel header 441, and the first multicast packet field 442. Furthermore, the first explicit multicast tunnel header 440 includes a home agent address field 443, a link local multicast address field 444, the third mobile node home network address field 445, and the fourth mobile node home network address field 446. Also, the second explicit multicast tunnel header 441 includes a home agent address field 447, a link local multicast address field 448, the third mobile node foreign agent COA field 449, and the fourth mobile node foreign agent COA field 450.

The home agent 320 encapsulates the first multicast packet by the first and the second explicit multicast tunnel headers 440, 441 when the home agent 320 transmits the multicast packet to the third and the fourth mobile nodes 310-3 and 310-4 through the foreign agent 340 because the foreign agent 340 doesn't have the information about the COA that the third and the fourth mobile nodes 310-3 and 310-4 are allocated. The home agent 320 transmits the fifth multicast packet generated by the multicast tunneling to the foreign agent 340, and the foreign agent 340 removes the second explicit multicast tunnel header 441 from the received fifth multicast packet. Then the foreign agent 340 duplicates the fifth multicast packet that is removed from the second explicit multicast tunnel header 441 and generates the sixth and the seventh multicast packets to be transmitted to the third mobile node 310-3 and the fourth mobile node 310-4.

Figure 4F:
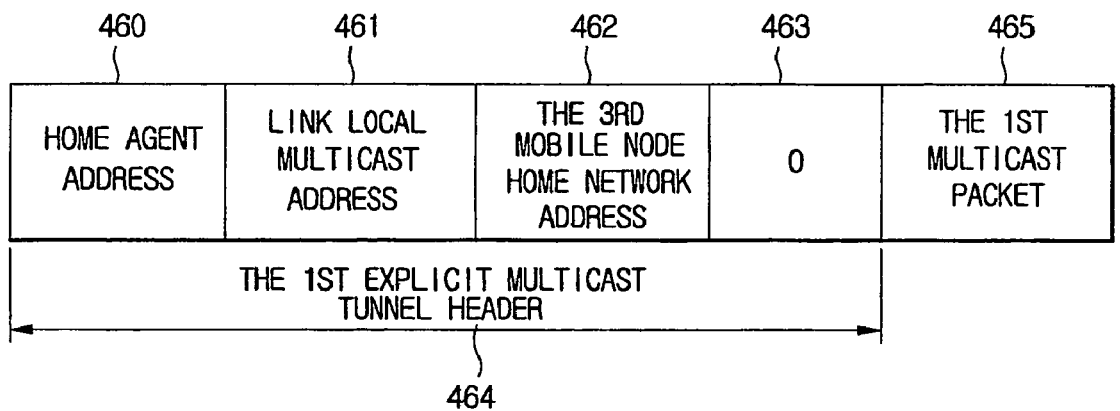

Additionally, as shown in FIG. 4F, the sixth multicast packet to be transmitted to the third mobile node 310-3 includes the first explicit multicast tunnel header 464 including a home agent address field 460 storing the home agent address, a link local multicast address field 461, the third mobile node home network address field 462 storing the third mobile node home network address and the fourth mobile node CL COA field 463 storing '0', and the first multicast packet field 465. The link local multicast address field 461 stores the link local multicast address, and the first multicast packet field 465 stores the first multicast packet.

Figure 4G:
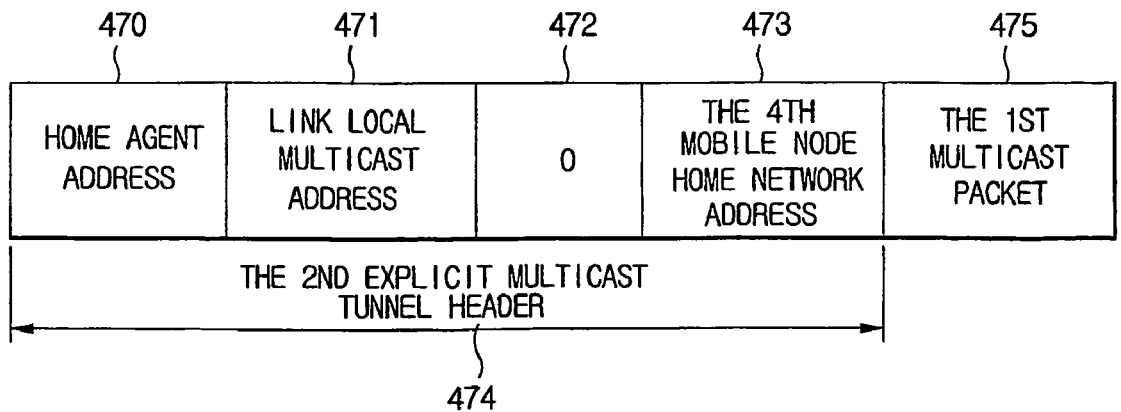

Also, as shown in FIG. 4G, the seventh multicast packet to be transmitted to the fourth mobile node 310-4 includes the second explicit multicast tunnel header 474 including a home agent address field 470 storing the home agent address, a link local multicast address field 471, the third mobile node home network address field 472 storing '0', the fourth mobile node home network address field 473 storing the fourth mobile node home network address, and the first multicast packet field 475. The link local multicast address field 471 stores link local multicast address, and the first multicast packet field 475 stores the first multicast packet.

The third and the fourth mobile nodes 310-3 and 310-4 identify the first multicast packet transmitted from the correspondent node 300 by removing each explicit multicast tunnel header 464, 474 from the sixth and the seventh multicast packets transmitted from foreign agent 340.

Figure 5:
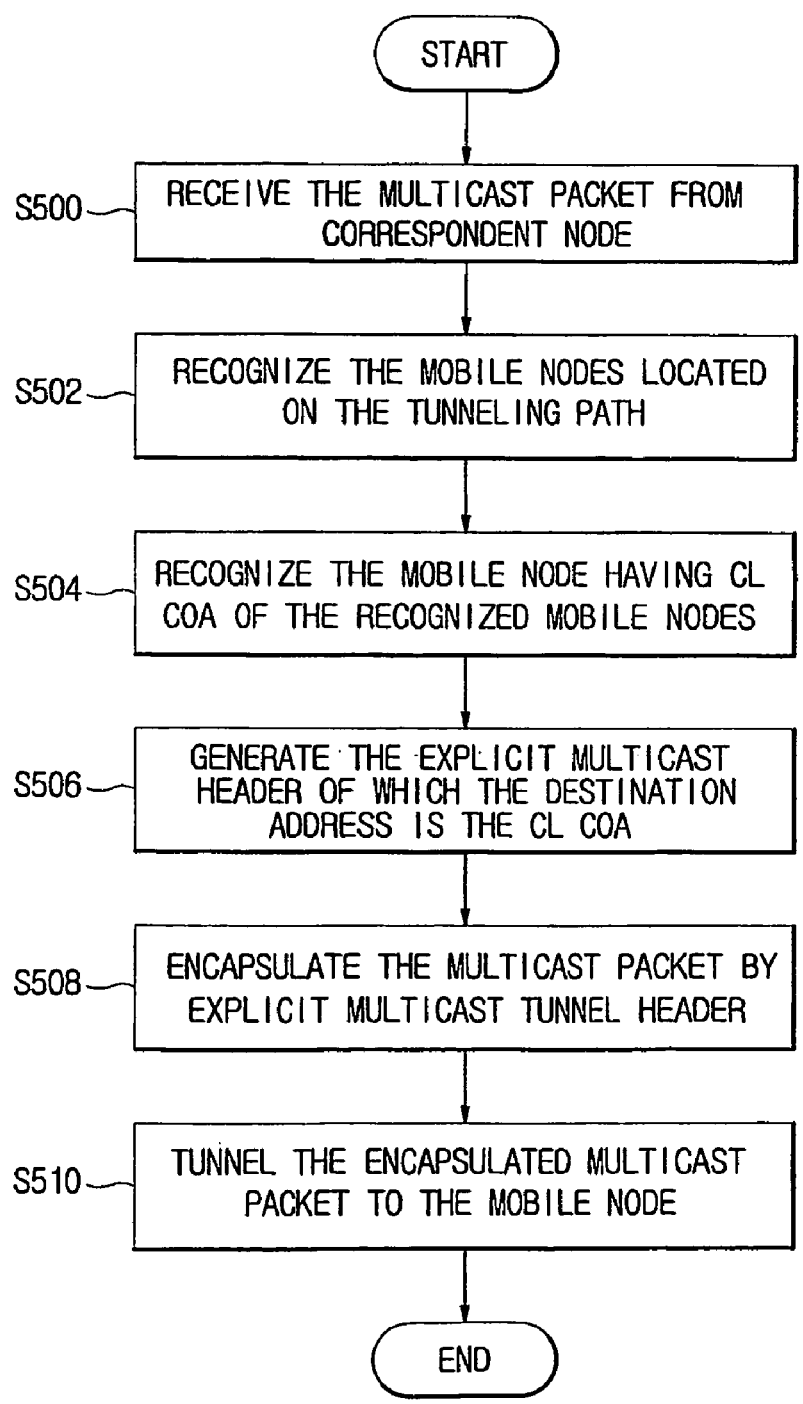
FIG. 5 is a flowchart representing the procedure for executing the first embodiment of an explicit multicast tunneling service on a mobile IP network according to the invention.

A method for explicit multicast tunneling service on a mobile network according to the invention will be described with reference to the accompanying drawings. FIG. 5 is a flowchart representing the procedure for executing the first embodiment of explicit multicast tunneling service on a mobile IP network according to the invention.

The home agent 320 receives the multicast packet to be transmitted to the first—the fourth mobile nodes 310-1, 310-2, 310-3 and 310-4 from the correspondent node 300 connected with home network (S500). As such, the received multicast packet includes the multicast address of a group for which the first—the fourth mobile nodes 310-1, 310-2, 310-3 and 310-4 that request multicast service belong. Then the home agent 320 recognizes the transmission path of the received multicast packet, the first—the fourth mobile nodes 310-1, 310-2, 310-3 and 310-4 (tunneling path) (S502).

The home agent 320 receives a join signal to receive multicast packets of the first—the fourth mobile nodes 310-1, 310-2, 310-3 and 310-4 in advance and recognizes the transmission path for tunneling by the received join signal. The home agent 320 of the first and the second mobile nodes 310-1, 310-2 includes the CL COA of the first—the fourth mobile nodes 310-1, 310-2, 310-3 and 310-4(S504). Then home agent 320 generates an explicit multicast tunnel header whose destination address is the CL COA of the recognized first and the second mobile nodes 310-1, 310-2 (S506), and encapsulates the multicast packet by the generated explicit multicast tunnel header (S508). Further, the encapsulated multicast packet includes the explicit multicast tunnel header including a transmitter address field storing the home agent address, a link local multicast address field and destination address field storing the first and the second mobile nodes CL COA, and multicast packet field.

The home agent 320 executes the explicit multicast tunneling by transmitting the encapsulated multicast packet to the first and the second mobile nodes 310-1, 310-2 (S510). In the step S510, multicast routing by plural via-routers can transmit the encapsulated multicast packet to the first and the second mobile nodes 310-1, 310-2.

Figure 6:
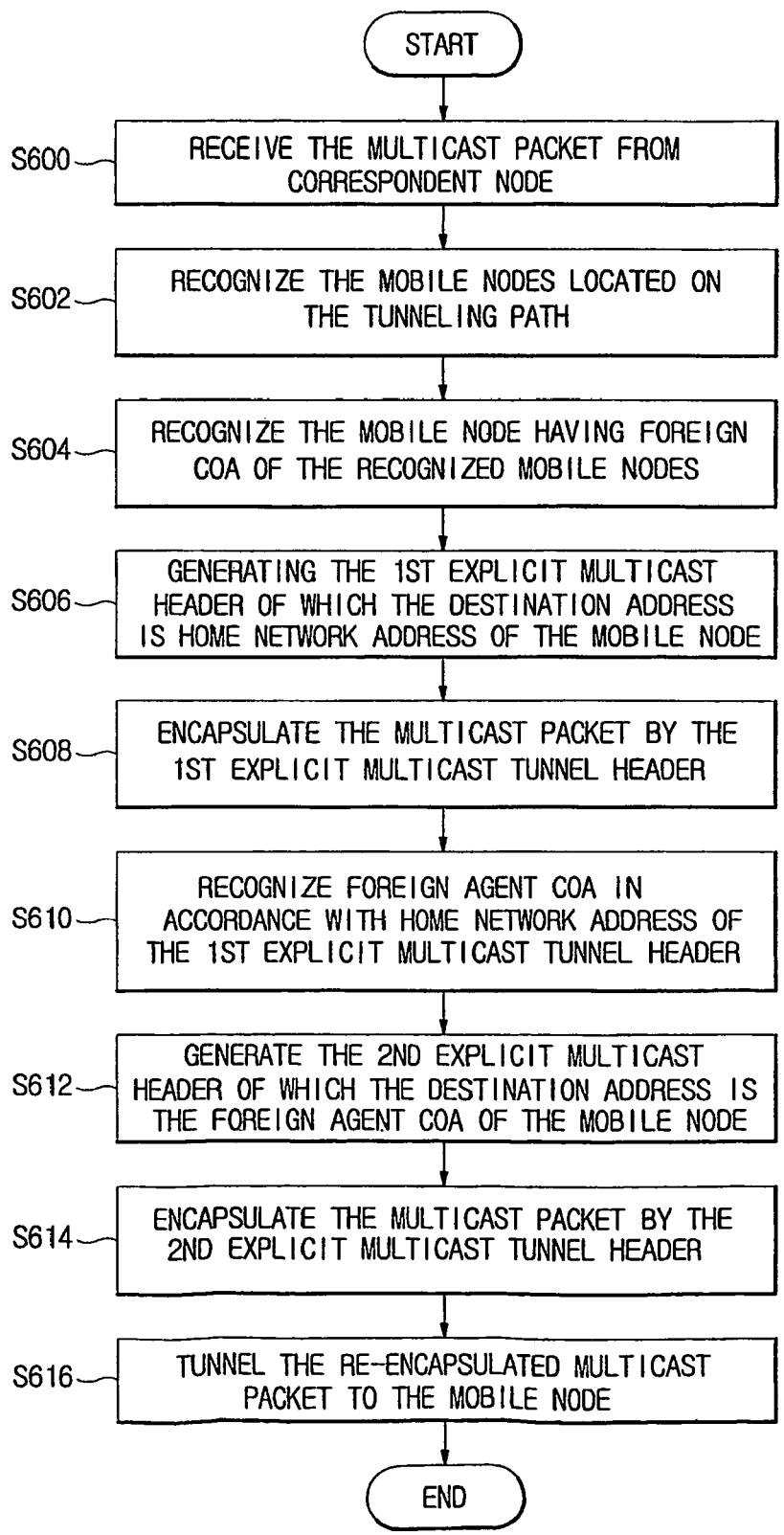
FIG. 6 is a flowchart representing the procedure for executing the first embodiment of an explicit multicast tunneling service on a mobile IP network according to the invention.

FIG. 6 is a flowchart representing the procedure for executing the first embodiment of explicit multicast tunneling service on a mobile IP network according to the invention. The home agent 320 receives the multicast packet to be transmitted from the correspondent node 300 connected with the home network to the first—the fourth mobile nodes 310-1, 310-2, 310-3 and 310-4 (S600). Then the home agent 320 recognizes the transmission path of the received multicast packet, that is, the first—the fourth mobile nodes 310-1, 310-2, 310-3 and 310-4 (tunneling path) (S602).

The home agent 320 recognizes the mobile node having the foreign agent COA of recognized tunneling path, the first-the fourth mobile nodes 310-1, 310-2, 310-3 and 310-4 (S604). That is, the home agent 320 recognizes the third and the fourth mobile nodes 310-3 and 310-4 that are connected with the foreign agent 340 and allocated foreign agent COA of the first-the fourth mobile nodes 310-1, 310-2, 310-3 and 310-4.

The home agent 320 generates the first explicit multicast tunnel header whose destination address is the home network address of the third and the fourth mobile nodes 310-3 and 310-4 recognized in the step S604 to transmit the multicast packet of the third and the fourth mobile node 310-3 and 310-4 (S606). Then the home agent 320 encapsulates the multicast packet transmitted from the correspondent node 300 by the generated first explicit multicast tunnel header (S608).

The home agent 320 recognizes the foreign agent COA of the third and the fourth mobile nodes 310-3 and 310-4 according to the home network address stored in the first explicit multicast tunnel header (S610). Then the home agent 320 generates the second explicit multicast tunnel header of which the destination address is the foreign agent COA of the recognized third and the fourth mobile nodes 310-3 and 310-4 (S612).

The home agent 320 encapsulates the multicast packet encapsulated by the second explicit multicast tunnel header in the step S612 again (S614). Then the home agent 320 transmits the re-encapsulated multicast packet to the foreign agent 340 and connects with the third and the fourth mobile nodes 310-3 and 310-4 by explicit multicast tunneling (S616). Further, the foreign agent 340 removes the second explicit multicast tunnel header from the re-encapsulated multicast packet transmitted from the home agent 320 and transmits it to the third and the fourth mobile nodes 310-3 and 310-4.

Also, the third and the fourth mobile nodes 310-3 and 310-4 remove the first explicit multicast tunnel header from the multicast packet transmitted from the foreign agent 340 to recognize the multicast packet transmitted from the correspondent node 300.

An apparatus and method for explicit multicast tunneling service according to one embodiment of the invention performs tunneling by generating an explicit multicast tunnel header, of which the destination address is the CL COA, and encapsulating the original packet using the generated explicit multicast tunnel header if the CL COA is allocated to the mobile node.

Also, an apparatus and method for explicit multicast tunneling service according to one embodiment of the invention generates the first explicit multicast, of which the destination address is the home network address of mobile node, is allocated a foreign agent COA, and encapsulates original packet by the first explicit multicast. Then the apparatus generates the second explicit multicast tunnel header, of which the foreign agent COA of the mobile node is allocated, and executes the tunneling by encapsulating the encapsulated multicast packet by the second explicit multicast tunnel header.

Therefore, according to various embodiments of the invention, transmission efficiency can be improved since the execution of the multicast can reduce the bandwidth and the transmission time for the transmission of the packet when the multicast packet is tunneled to plural mobile nodes.

While the above description has pointed out novel features of the invention as applied to various embodiments, the skilled person will understand that various omissions, substitutions, and changes in the form and details of the device of the device or process illustrated may be made without departing from the scope of the invention. Therefore, the scope of the invention is defined by the appended claims rather than by the foregoing description. All variations coming within the meaning and rage of equivalency of the claims are embraced within their scope.

What is claimed is:

1. A method of multicast tunneling service on a mobile IP network; comprising:

receiving a multicast packet from a source to be sent to a plurality of mobile terminals, wherein the plurality of mobile terminals include at least one of a first mobile group using a co-located care of address (CL COA) and a second mobile group using a foreign agent COA, and wherein terminals of the first mobile group are in data communication with a home agent and terminals of the second mobile group are in data communication with a foreign agent;

modifying, at the home agent, the received multicast packet such that the modified multicast packet is transmitted to the at least one of the first and second mobile groups;

transmitting the modified multicast packet to a transit node;

duplicating, at the transit node and/or the foreign agent, the modified multicast packet as many times as the number of the first mobile group terminals and/or the number of the second mobile group terminals, respectively; and transmitting each of the duplicated multicast packets to a respective mobile terminal.

2. The method of claim 1, wherein the modifying comprises:

recognizing destination addresses of the terminals of the first mobile group based on the received multicast packet;

generating a multicast tunnel header having a destination address comprising an address list of the first mobile group terminals; and encapsulating the received multicast packet with the generated multicast tunnel header.

3. The method of claim 2, wherein the multicast tunnel header includes a home agent address field, a link local multicast address field, and a mobile terminal COA field storing the COAs of the first mobile group terminals.

4. The method of claim 1, wherein the modifying comprises:

recognizing destination addresses of the terminals of the second mobile group based on the received multicast packet;

generating a first multicast tunnel header having a destination address comprising an address list of the second mobile group terminals;

first encapsulating the received multicast packet with the first multicast tunnel header;

generating a second multicast tunnel header having a destination address comprising an address list of foreign agent COAs for the second mobile group terminals; and second encapsulating the first encapsulated multicast packet with the second multicast tunnel header.

5. The method of claim 4, further comprising:

transmitting the second encapsulated multicast packet to the foreign agent; and removing, at the foreign agent, the second multicast tunnel header from the second encapsulated multicast packet.

6. The method of claim 4, wherein the first multicast tunnel header includes a home agent address field, a link local multicast address field, and a home network address list field for the second mobile group terminals.

7. The method of claim 4, wherein the second multicast tunnel header includes a home agent address field, a link local multicast address field, and a foreign agent COA list field.

8. The method of claim 1, further comprising modifying destination addresses of each of the duplicated multicast packets such that each mobile terminal does not repeatedly receive the same multicast packet.

9. The method of claim 1, wherein the home agent does not duplicate the received multicast packet as many times as the number of the terminals of the at least one of the first and second mobile groups.

10. An apparatus for multicast tunneling service on a mobile IP network, comprising:

a home agent configured to receive a multicast packet from a source to be sent to a plurality of mobile terminals, wherein the plurality of mobile terminals include at least one of a first mobile group using a co-located care of address (CL COA) and a second mobile group using a foreign agent COA, and wherein terminals of the first mobile group are in data communication with the home agent and terminals of the second mobile group are in data communication with a foreign agent, wherein the home agent is further configured to modify the received multicast packet such that the modified multicast packet is transmitted to the at least one of the first and second mobile groups; and a transit node being in data communication with at least one of the home agent and the foreign agent, wherein the transit node and/or the foreign agent are (is) configured to duplicate the multicast packet as many times as the number of the first mobile group terminals and/or the number of the second mobile group terminals, respectively and to transmit each of the duplicated multicast packets to a respective mobile terminal.

11. The apparatus of claim 10, wherein the home agent is further configured to (i) recognize destination addresses of the terminals of the first mobile group based on the received multicast packet, (ii) generate a multicast tunnel header having a destination address comprising an address list of the first mobile group terminals and (iii) encapsulate the received multicast packet with the generated multicast tunnel header.

12. The apparatus of claim 11, wherein the multicast tunnel header includes a home agent address field, a link local multicast address field, and a mobile terminal COA field storing the COAs of the first mobile group terminals.

13. The apparatus of claim 10, wherein the home agent is further configured to (i) recognize destination addresses of the terminals of the second mobile group based on the received multicast packet, (ii) generate a first multicast tunnel header having a destination address comprising an address list of the second mobile group terminals, (iii) first encapsulate the received multicast packet with the first multicast tunnel header, iv) generate a second multicast tunnel header having a destination address comprising an address list of foreign agent COAs for the second mobile group terminals and v) second encapsulate the first encapsulated multicast packet with the second multicast tunnel header.

14. The apparatus of claim 13, wherein the foreign agent is configured to remove the second multicast tunnel header from the second encapsulated multicast packet and to transmit the second encapsulated multicast packet to each of the second mobile group terminals.

15. The apparatus of claim 10, wherein each of the plurality of mobile terminals includes one of the following: a portable computer, a mobile phone and other portable communication devices.

* * * * *